US012724438B2

(12) United States Patent
Lee et al.

(10) Patent No.: US 12,724,438 B2
(45) Date of Patent: Sep. 1, 2026

(54) SYSTEM ON CHIP, BUS POWER GATING METHOD THEREOF, AND BUS POWER GATING SYSTEM

(71) Applicant: Samsung Electronics Co., Ltd., Suwon-si (KR)

(72) Inventors: Iksu Lee, Suwon-si (KR); Jongsung Kang, Suwon-si (KR); Junghun Heo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 302 days.

(21) Appl. No.: 18/159,787

(22) Filed: Jan. 26, 2023

(65) Prior Publication Data

US 2023/0273630 A1 Aug. 31, 2023

(30) Foreign Application Priority Data

Feb. 25, 2022 (KR) ........................ 10-2022-0025513
Jun. 7, 2022 (KR) ........................ 10-2022-0069112

(51) Int. Cl.

| | |
|---|---|
| ***G05F 1/46*** | (2006.01) |
| ***G06F 1/20*** | (2006.01) |
| ***G06F 1/32*** | (2019.01) |
| ***G06F 1/3234*** | (2019.01) |

(52) U.S. Cl.

CPC ................ *G05F 1/46* (2013.01); *G06F 1/203* (2013.01); *G06F 1/3253* (2013.01)

(58) Field of Classification Search

CPC ............................. G06F 1/3253; G06F 1/3275
See application file for complete search history.

(56) References Cited

U.S. PATENT DOCUMENTS

| | | | | |
|---|---|---|---|---|
| 7,369,815 | B2 | 5/2008 | Kang et al. | |
| 8,601,297 | B1 * | 12/2013 | Abts | G06F 1/3253 713/320 |
| 8,958,301 | B2 * | 2/2015 | Volpe | H04L 47/25 370/386 |
| 9,285,865 | B2 * | 3/2016 | Keish | G06F 1/3243 |
| 9,348,400 | B2 * | 5/2016 | Lejeune | H04L 12/12 |
| 9,785,211 | B2 | 10/2017 | Koob et al. | |
| 10,146,296 | B2 | 12/2018 | Gainey et al. | |
| 10,209,758 | B2 | 2/2019 | Gu et al. | |
| 10,601,217 | B2 | 3/2020 | Batenburg et al. | |
| 10,908,667 | B2 | 2/2021 | Severino et al. | |
| 2003/0126377 | A1 | 7/2003 | Orenstien et al. | |
| 2007/0094437 | A1 * | 4/2007 | Jabori | G06F 1/206 710/307 |

(Continued)

FOREIGN PATENT DOCUMENTS

| | | |
|---|---|---|
| KR | 10-0703720 B1 | 4/2007 |
| KR | 10-2014-0061378 A | 5/2014 |

*Primary Examiner* — Jaweed A Abbaszadeh
*Assistant Examiner* — Cheri L Harrington
(74) *Attorney, Agent, or Firm* — Harness, Dickey & Pierce, P.L.C.

(57) ABSTRACT

A power gating method of a system on chip includes transferring a first control signal to a bus by using a power management unit (PMU), transferring a response signal to the PMU by using the bus, in response to the first control signal, moving a transaction to a light bus circuit by using the bus, and transferring a second control signal to a power control circuit by using the PMU to adjust power supplied to the bus, based on the response signal.

20 Claims, 14 Drawing Sheets

(56) References Cited

U.S. PATENT DOCUMENTS

2010/0316065 A1* 12/2010 Kapil .................... G06F 13/385
370/465
2014/0101468 A1* 4/2014 Narayanan ............ G06F 1/3287
713/320
2016/0328008 A1* 11/2016 Ware ..................... G06F 1/3278
2019/0369701 A1* 12/2019 Lien ...................... G06F 1/3237
2023/0076468 A1* 3/2023 Schluessler ........... G06F 1/3253
2024/0411356 A1* 12/2024 McLellan ............. G06F 1/3243

* cited by examiner

Figure 13:
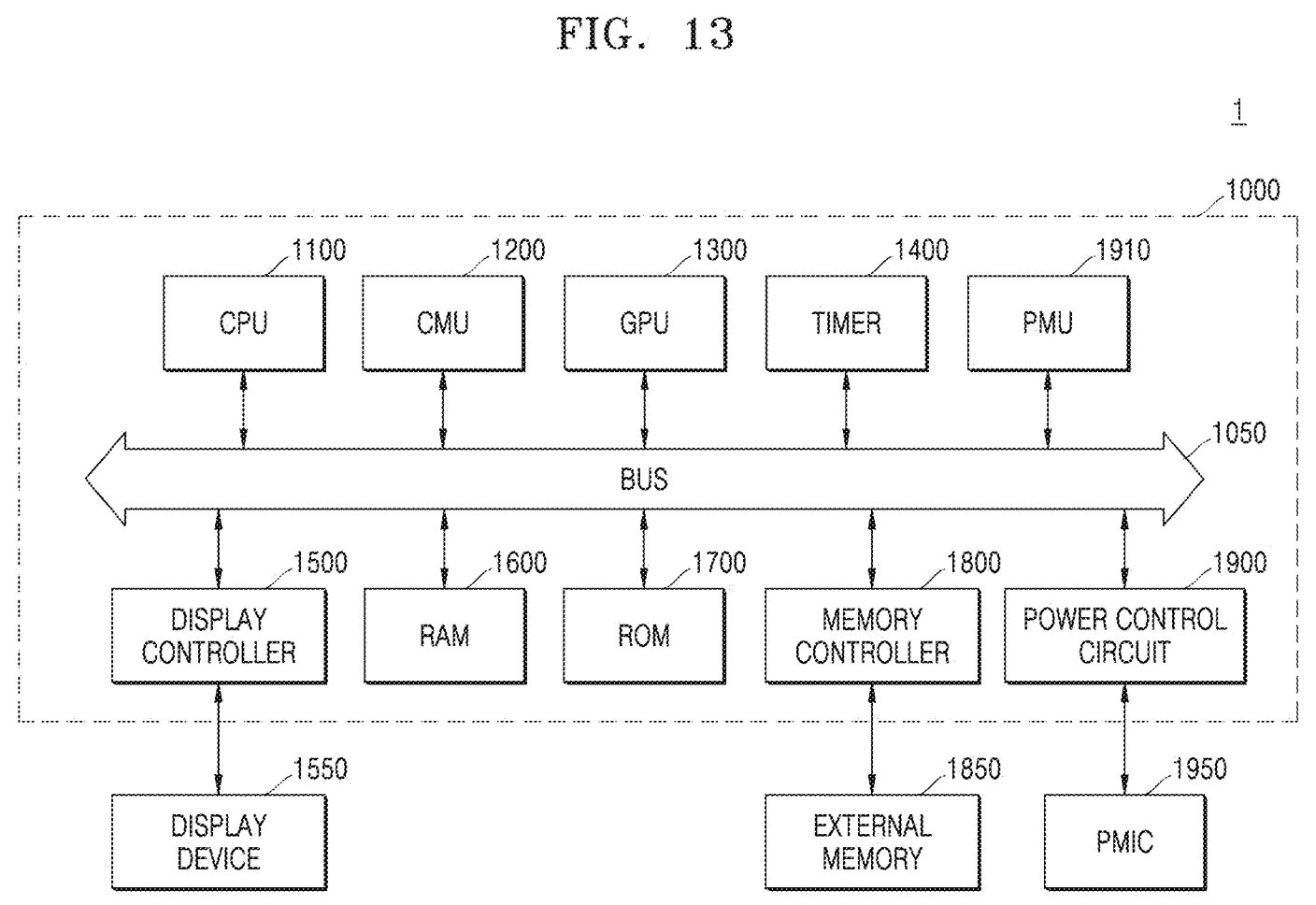

BUS

1100 CPU

1200 CMU

1300 GPU

1400 TIMER

1910 PMU

1500 DISPLAY CONTROLLER

1600 RAM

1700 ROM

1800 MEMORY CONTROLLER

1900 POWER CONTROL CIRCUIT

1550 DISPLAY DEVICE

1850 EXTERNAL MEMORY

1950 PMIC

SYSTEM ON CHIP, BUS POWER GATING METHOD THEREOF, AND BUS POWER GATING SYSTEM

CROSS-REFERENCE TO RELATED APPLICATIONS

This application is based on and claims priority under 35 U.S.C. § 119 to Korean Patent Application Nos. 10-2022-0025513, filed on Feb. 25, 2022, and 10-2022-0069112, filed on Jun. 7, 2022, in the Korean Intellectual Property Office, the disclosures of which are incorporated by reference herein in their entireties.

BACKGROUND

Example embodiments relate to a system on chip, and more particularly, to a system on chip, a power gating method thereof, and a bus.

In a mobile system on chip (SOC), a multimedia function is increasing, and thus, an area of a backbone bus is increasing for improving performance. Also, a semiconductor process is finely subdivided and an operation frequency of a bus is increasing, and due to this, there is a challenge where leakage power of a backbone bus increases. Power gating may be applied to a backbone bus so as to decrease the leakage power, but in power gating of the backbone bus, it has to be ensured that a transaction does not at all occur for a long time because power gating entry latency is large. Therefore, when a frequent transaction occurs with a short idle, there is a challenge where performance is reduced due to power gating entry latency, and due to this, there is a challenge where a power gating entry rate is very low or entry is impossible. Therefore, technology for efficiently performing power gating on a backbone bus is needed.

SUMMARY

Example embodiments provide a method and an apparatus, which enhance a bus power gating entry rate and decrease bus power gating entry latency in a system on chip, a power gating method of the system on chip, and a bus.

According to an example embodiment of the inventive concepts, there is provided a power gating method of a system on chip, the power gating method including transferring a first control signal to the bus by using a power management unit (PMU), transferring a response signal to the PMU by using the bus, in response to the first control signal, moving a transaction to a light bus circuit by using the bus, and transferring a second control signal to a power control circuit by using the PMU to adjust power supplied to the bus, based on the response signal.

According to another example embodiment of the inventive concepts, there is provided a system on chip including a bus including a main bus circuit and a light bus circuit, the bus being configured to process a transaction by using the main bus circuit and the light bus circuit and allow a pending transaction to be processed by the light bus circuit, based on a transaction threshold value of the light bus circuit, a power control circuit including a main bus power switch, a light bus power switch, and a power path controller, the power control circuit being configured to control power supplied to the bus, and a power management unit (PMU) configured to generate a first control signal and a second control signal based on an amount of transactions, transfer the first control signal to the bus to control an operation of the bus, and transfer the second control signal to the power control circuit to control an operation of the power control circuit.

According to another example embodiment of the inventive concepts, there is provided a bus including a main bus circuit and a light bus circuit each configured to process a transaction of the bus, wherein, in response to the amount of transaction being greater than or equal to a transaction threshold value of the light bus circuit, the bus is configured to process the transaction by using the main bus circuit and the light bus circuit, and in response to the amount of transaction being less than the transaction threshold value, the bus is configured to process a pending transaction by using the light bus circuit.

BRIEF DESCRIPTION OF THE DRAWINGS

Example embodiments will be more clearly understood from the following detailed description taken in conjunction with the accompanying drawings in which:

FIG. 13 is a block diagram illustrating an electronic device according to some example embodiments.

DETAILED DESCRIPTION OF THE EXAMPLE EMBODIMENTS

Hereinafter, some example embodiments will be described in detail with reference to the accompanying drawings.

Figure 1:
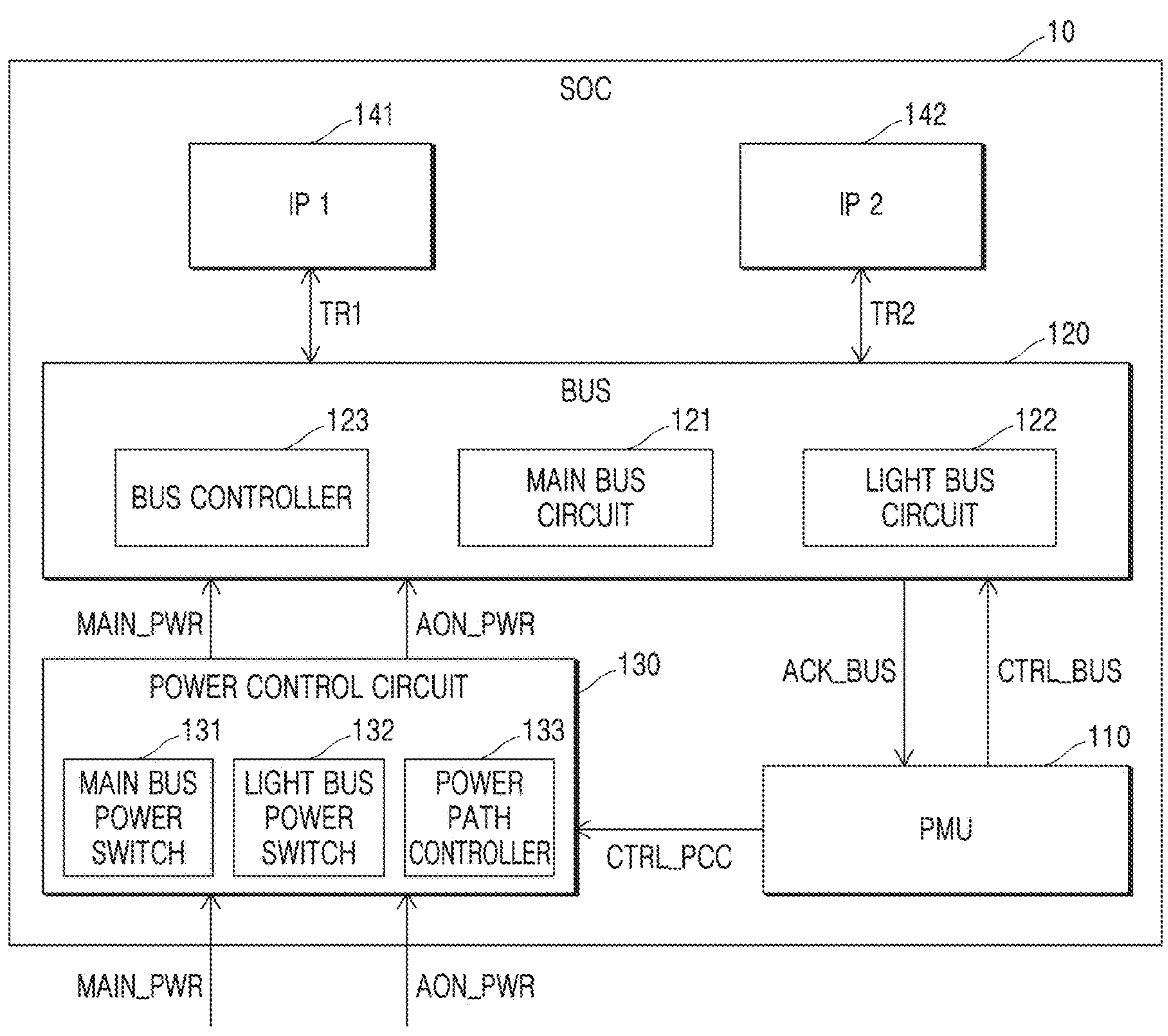
FIG. 1 illustrates a system on chip according to some example embodiments.

FIG. 1 illustrates a system on chip 10 according to some example embodiments.

The system on chip (SOC) 10 may include a power management unit (PMU) 110, a bus 120, a power control circuit 130, and intellectual property (IP) blocks 141 and 142. Although two IP blocks 141 and 142 are illustrated as including a first IP block 141 and a second IP block 142, there may actually be more or fewer IP blocks.

The SOC 10 may be a technology-intensive semiconductor where a total system is integrated into one chip. That is, the SOC 10 may be some example embodiments where a system configured with devices having various functions is implemented as one chip. When devices having various functions are integrated into one chip, a product may be miniaturized, and the manufacturing cost may be reduced, compared to a case where semiconductors having each function are separately manufactured.

The SOC 10 may receive an external supply voltage from the outside so as to perform various functions. In some example embodiments, the SOC 10 may be supplied with main power MAIN_PWR and always on power AON_PWR from the PMIC 110.

The PMU 110 may control the bus 120 and the power control circuit 130 so as to adjust power needed or desired for an operation of the SOC 10. The PMU 110 may generate a first control signal CTRL_BUS and a second control signal CTRL_PCC, based on the amount of transactions being processed or to be processed by the bus 120. In some example embodiments, when the amount of transactions being processed or to be processed by the bus 120 is less than a transaction threshold value capable of being processed by a light bus circuit 122, the PMU 110 may generate the first control signal CTRL_BUS and the second control signal CTRL_PCC.

The PMU 110 may transfer the first control signal CTRL_BUS to the bus 120 and may receive a response signal ACK_BUS from the bus 120 to control power, which is to be supplied to the bus 120. For example, the first control signal CTRL_BUS may be a low power interface (LPI) request. In some example embodiments, the PMU 110 may transfer an LPI request signal to the bus 120, and thus, may control the bus 120 to process a transaction with low power. For example, in a case where the bus 120 processes a transaction through the light bus circuit 122, the bus 120 may operate with the always on power AON_PWR instead of the main power MAIN_PWR, and accordingly, the bus 120 may process the transaction with lower power.

The PMU 110 may transfer the second control signal CTRL_PCC to the power control circuit 130 to adjust power supplied to the bus 120. For example, the second control signal CTRL_PCC may be a signal, which adjusts power of the bus 120. In some example embodiments, the PMU 110 may receive the response signal ACK_BUS from the bus 120 and may transfer the second control signal CTRL_PCC to the power control circuit 130 to adjust power supplied to the bus 120.

Although not shown, the PMU 110 may include a special function register (SFR) associated with a transaction threshold value processable by the light bus circuit 122, and the SFR may include information about the transaction threshold value. A transaction threshold value corresponding to a transaction limit processable by the main bus circuit 121 may be greater than a transaction threshold value corresponding to a transaction limit processable by the light bus circuit 122. A detailed example embodiment where power gating is implemented in the bus 120 is described in more detail with reference to FIGS. 2 to 6.

The bus 120 may connect various elements of the SOC 10 to one another. The bus 120 may include a backbone bus. Although the SOC 10 is illustrated as including one bus 120, the SOC 10 may actually include more buses.

The bus 120 may operate based on one of various bus protocols. The various bus protocols may include at least one of advanced microcontroller bus architecture (AMBA) protocol, universal serial bus (USB) protocol, multimedia card (MMC) protocol, peripheral component interconnection (PCI) protocol, PCI-express (PCI-E) protocol, advanced technology attachment (ATA) protocol, serial-ATA protocol, parallel-ATA protocol, small computer small interface (SCSI) protocol, enhanced small disk interface (ESDI) protocol, integrated drive electronics (IDE) protocol, mobile industry processor interface (MIPI) protocol, and universal flash storage (UFS) protocol.

The bus 120 may include the main bus circuit 121, the light bus circuit 122, and a bus controller 123, so as to process transactions TR1 and TR2 on the IP blocks 141 and 142. The bus 120 may process a transaction by using the main bus circuit 121 or the light bus circuit 122, based on the amount of transactions. The main bus circuit 121 may be supplied with the main power MAIN_PWR and may process a transaction of the bus 120. The light bus circuit 122 may be supplied with the main power MAIN_PWR or the always on power AON_PWR and may process the transaction of the bus 120. In this case, a transaction, which is processed by the light bus circuit 122 supplied with the always on power AON_PWR may be a pending transaction. In some example embodiments, in a case where the light bus circuit 122 has to process a transaction, which is greater than or equal to the transaction threshold value of the light bus circuit 122, the light bus circuit 122 may be supplied with the main power MAIN_PWR and may process the transaction. In some example embodiments, in a case where the light bus circuit 122 has to process a transaction, which is less than the transaction threshold value of the light bus circuit 122, the light bus circuit 122 may be supplied with the always on power AON_PWR and may process the transaction. A detailed example embodiment where power gating is implemented in the bus 120 is described in more detail with reference to FIGS. 2 to 6.

The power control circuit 130 may be supplied with power from an external power source and may supply the power to the bus 120. The power control circuit 130 may include a main bus power switch 131, a light bus power switch 132, and a power path controller 133. In some example embodiments, the power control circuit 130 may be supplied with the main power MAIN_PWR and the always on power AON_PWR from the external power source. For example, external power may be supplied by the PMIC 20. In some example embodiments, power capable of being supplied to the bus 120 with the main power MAIN_PWR may be greater than power capable of being supplied to the bus 120 with the always on power AON_PWR.

The power control circuit 130 may adjust power supplied to the bus 120 based on the second control signal CTRL_PCC of the PMU 110. In response to the second control signal CTRL_PCC of the PMU 110, the main bus power switch 131 may supply power to the main bus circuit 121, or may cut off power supplied thereto. In response to the second control signal CTRL_PCC of the PMU 110, the light bus power switch 132 may supply power to the light bus circuit 122, or may cut off power supplied thereto. In response to the second control signal CTRL_PCC of the PMU 110, the power path controller 133 may operate to select power, which is to be supplied to the light bus circuit 122, or so that any power is not supplied thereto.

In some example embodiments, when the amount of transactions of the bus 120 is high, the PMU 110 may control the power control circuit 130 so that the bus 120 processes a transaction by using the main power MAIN_PWR, and the power control circuit 130 may adjust power so that the main power MAIN_PWR is supplied to the bus 120, based on control by the PMU 110. When the amount of transactions of the bus 120 is low, the PMU 110 may control the power control circuit 130 so that the light bus circuit 122 processes a transaction by using the always on power AON_PWR, and the power control circuit 130 may adjust power so that the always on power AON_PWR is supplied to the light bus circuit 120, based on control by the PMU 110.

Figure 2:
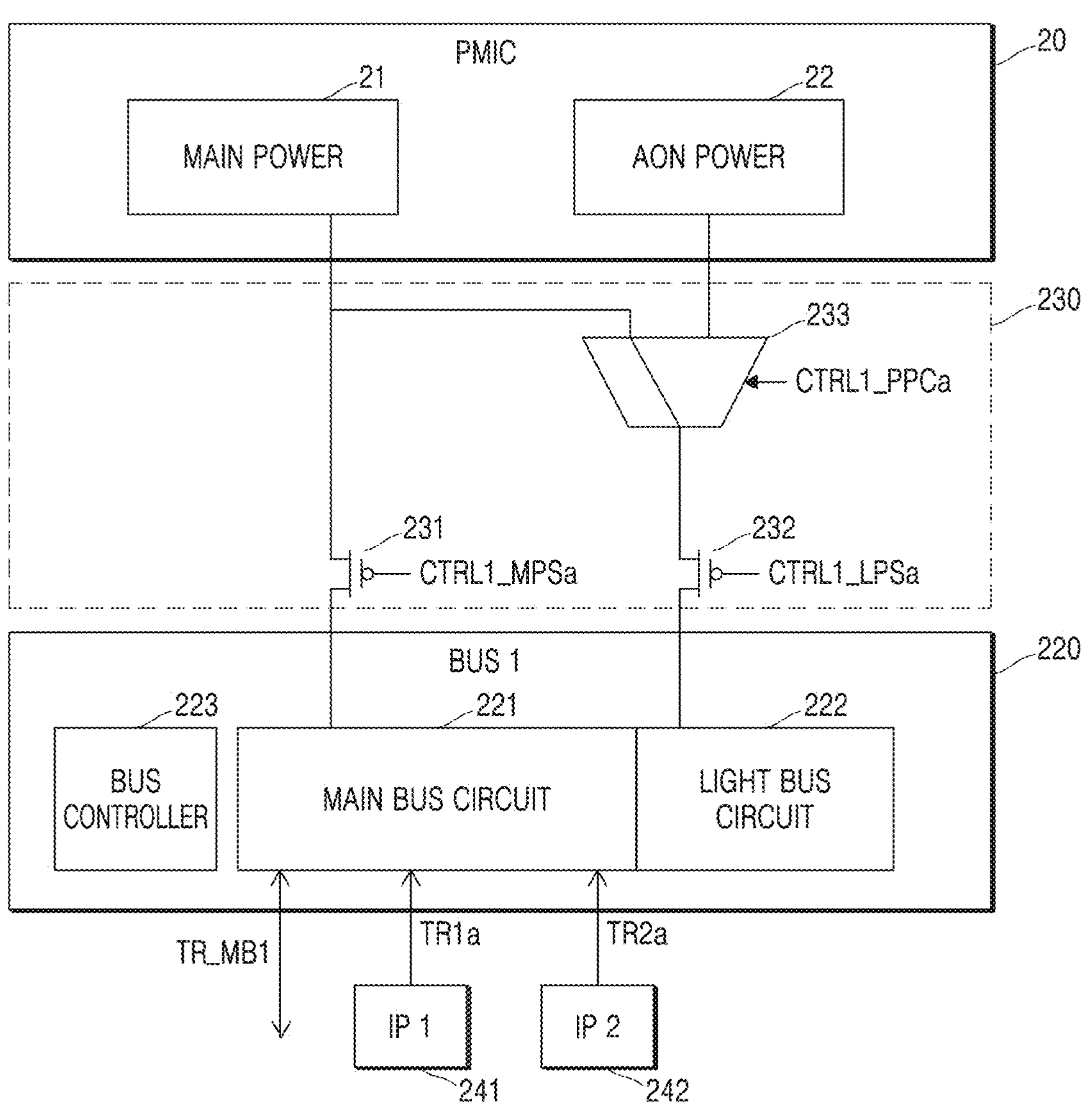
FIG. 2 is a diagram illustrating power supplied to a bus when a transaction amount of the bus is high, according to some example embodiments.

FIG. 2 is a diagram illustrating power supplied to a bus when the amount of transactions of the bus is high, according to some example embodiments. A first bus 220 may correspond to the bus 120 of FIG. 1. A power control circuit 230 of FIG. 2 may correspond to the power control circuit 130 of FIG. 1. FIG. 2 will be described with reference to FIG. 1.

A PMIC 20 may include main power 21 and always on (AON) power 22. Although the PMIC 20 is illustrated as including two power sources (main power 21 and AON power 22), the PMIC 20 may actually include more or fewer power sources. The PMIC 20 may supply power, which is needed or desired for processing a transaction, by using the first bus 220. The PMIC 20 may adjust power supplied to the first bus 220 by using the power control circuit 230. In some example embodiments, the main power 21 or the AON power 22 supplied to the first bus 220 by the PMIC 20 may be transferred to a main bus circuit 321 or a light bus circuit 322 or may be cut off, based on control by the power control circuit 230.

The first bus 220 may include a main bus circuit 221, a light bus circuit 222, and a bus controller 223. Although not shown, the first bus 220 may include a bridge, and the main bus circuit 221 may be connected to the light bus circuit 222 through the bridge. The first bus 220 may process transactions TR1*a* and TR2*a* by using at least one of the main bus circuit 221 and the light bus circuit 222, based on the amounts of transactions TR1*a* and TR2*a* generated by IP blocks 241 and 242 connected to the first bus 220. Although it is illustrated that two IP blocks (for example, a first IP block 241 and a second IP block 242) transfer the transactions TR1*a* and TR2*a* to the first bus 220, the number of connected IP blocks may be more or fewer.

The main bus circuit 221 may transfer or receive a transaction TR_MB1 to or from other devices. For example, the other devices may include another bus, IP block, or memory.

In some example embodiments, the bus controller 223 may move a transaction, which is to be processed between the main bus circuit 221 and the light bus circuit 222. Although it is illustrated that the first IP block 241 and the second IP block 242 are connected to the main bus circuit 221 and process the transactions TR1*a* and TR2*a*, the light bus circuit 222 may process the transactions TR1*a* and TR2*a* along with the main bus circuit 221.

In some example embodiments, the first bus 220 may be in a state where the amount of transactions to be processed is high, based on the transaction TR1*a* by the first IP block 241 and the transaction TR2*a* by the second IP block 242. When the amounts of transactions TR1*a* and TR2*a* by the first and second IP blocks 241 and 242 is high, the first bus 220 may process the transactions TR1*a* and TR2*a* of the first bus 220 by using both of the main bus circuit 221 and the light bus circuit 222. For example, the amounts of transactions TR1*a* and TR2*a* by the first and second IP blocks 241 and 242 may be greater than or equal to a transaction threshold value corresponding to a transaction limit processable by the light bus circuit 322 of the first bus 220, or may be greater than or equal to a transaction threshold value corresponding to a transaction limit processable by the main bus circuit 221 of the first bus 220.

The power control circuit 230 may include a main bus power switch 231, a light bus power switch 232, and a power path controller 233. The power control circuit 230 may control power supplied to the first bus 220, based on the second control signal CTRL_PCC of the PMU 110. In some example embodiments, the second control signal CTRL_PCC of FIG. 1 may include a main bus power switch control signal CTRL1_MPSa, a light bus power switch control signal CTRL1_LPSa, and a power path controller control signal CTRL1_PPCa.

According to some example embodiments, when the amount of transactions to be processed by the first bus 220 is greater than or equal to a transaction threshold value processable by the light bus circuit 222, the PMU 110 may transfer the second control signal CTRL_PCC to the power control circuit 230. In response to the main bus power switch control signal CTRL1_MPSa included in the second control signal CTRL_PCC, the power control circuit 230 may perform control so that the main power 21 is supplied to the main bus circuit 221. In response to the power path controller control signal CTRL1_PPCa included in the second control signal CTRL_PCC, the power control circuit 230 may perform control so that the power path controller 233 selects the main power 21 from among the main power 21 and the AON power 22. In response to the light bus power switch control signal CTRL1_LPSa included in the second control signal CTRL_PCC, the power control circuit 230 may perform control so that the main power 21 is supplied to the light bus circuit 222.

Figure 3:
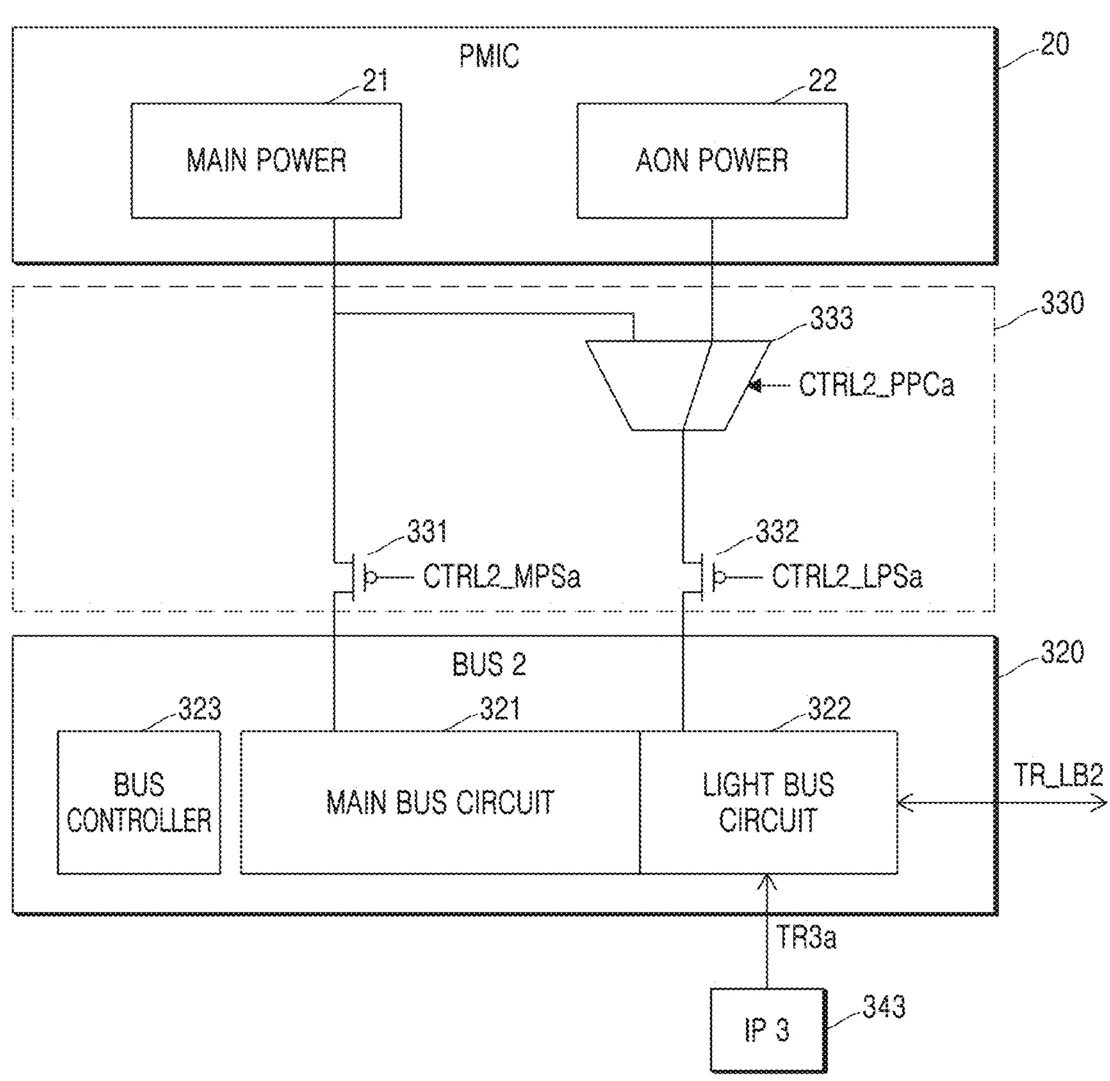
FIG. 3 is a diagram illustrating power supplied to a bus when a transaction amount of the bus is low, according to some example embodiments.

FIG. 3 is a diagram illustrating power supplied to a bus when the amount of transactions of the bus is low, according to some example embodiments. A second bus 320 may correspond to the bus 120 of FIG. 1. A power control circuit 330 of FIG. 3 may correspond to the power control circuit 130 of FIG. 1. FIG. 3 will be described with reference to FIGS. 1 and 2. Descriptions which are the same as or similar to the descriptions of FIGS. 1 and 2 may be omitted.

The PMIC 20 may supply power, which is needed or desired for processing a transaction, by using the second bus 320. The PMIC 20 may adjust power supplied to the second bus 320 by using the power control circuit 330. In some example embodiments, main power 21 or AON power 22 supplied by the PMIC 20 may be transferred to a main bus circuit 321 or a light bus circuit 322 or may be cut off, based on control by the power control circuit 330.

The second bus 320 may include a main bus circuit 321, a light bus circuit 322, and a bus controller 323. Although not shown, the second bus 320 may include a bridge, and the main bus circuit 321 may be connected to the light bus circuit 322 through the bridge. The second bus 320 may process a transaction by using at least one of the main bus circuit 321 and the light bus circuit 322, based on the amount of transactions TR3*a* generated by a third IP block 343 connected to the second bus 320. Although it is illustrated that only one IP block (for example, the third IP block 343) transfers a transaction to the second bus 320, the number of connected IP blocks may be more. The light bus circuit 322 may transfer or receive a transaction TR_LB2 to or from other devices. For example, the other devices may include another bus, IP block, or memory. In some example embodiments, the bus controller 323 may move a transaction which is to be processed between the main bus circuit 321 and the light bus circuit 322.

In some example embodiments, the second bus 320 may be in a state where the amount of transactions to be processed is low, based on the transaction TR3*a* by the third IP block 343. When the amount of transactions TR3*a* by the third IP block 343 is low, the second bus 320 may process the transaction TR3*a* of the second bus 320 by using the light bus circuit 322. For example, the amount of transactions TR3*a* by the third IP block 343 may be less than a transaction threshold value corresponding to a transaction limit processable by the light bus circuit 322 of the second bus 320.

The power control circuit 330 may include a main bus power switch 331, a light bus power switch 332, and a power path controller 333. The power control circuit 330 may control power supplied to the second bus 320, based on the second control signal CTRL_PCC of the PMU 110. In some example embodiments, the second control signal CTRL_PCC of FIG. 1 may include a main bus power switch control signal CTRL2_MPSa, a light bus power switch control signal CTRL2_LPSa, and a power path controller control signal CTRL2_PPCa.

According to some example embodiments, when the amount of transactions to be processed by the second bus 320 is less than a transaction threshold value processable by the light bus circuit 322, the PMU 110 may transfer the first control signal CTRL_BUS to the second bus 320 and may transfer the second control signal CTRL_PCC to the power control circuit 330. In response to the main bus power switch control signal CTRL2_MPSa included in the second control signal CTRL_PCC, the power control circuit 330 may perform control so that the main bus power switch 331 cuts off the supply of the main power 21 to the main bus circuit 321. In response to the power path controller control signal CTRL2_PPCa included in the second control signal CTRL_PCC, the power control circuit 330 may perform control so that the power path controller 333 selects the AON power 22 from among the main power 21 and the AON power 22. In response to the light bus power switch control signal CTRL2_LPSa included in the second control signal CTRL_PCC, the power control circuit 330 may perform control so that the AON power 22 is supplied to the light bus circuit 322.

Figure 4:
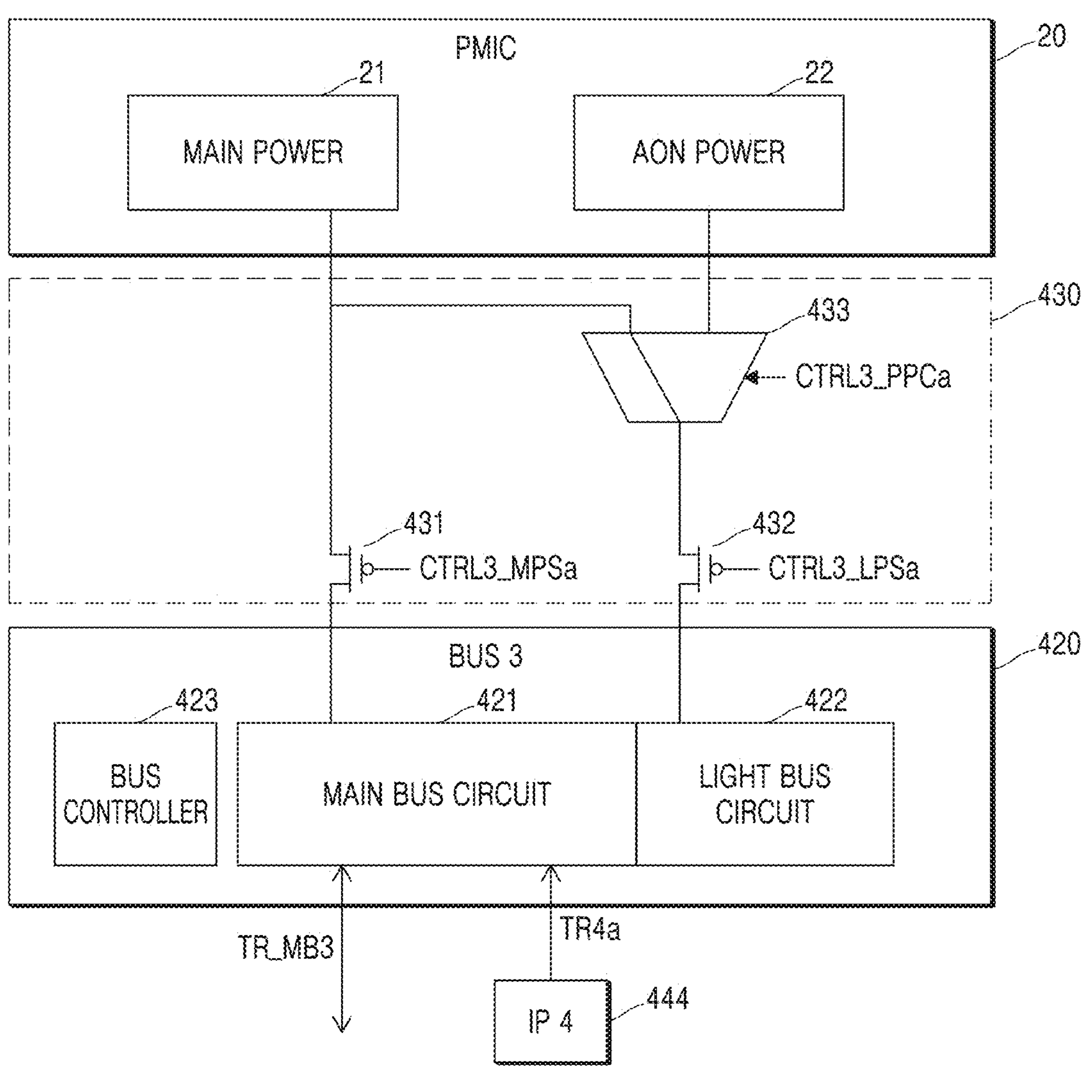
FIG. 4 is a diagram illustrating power supplied to a bus when a transaction amount of the bus is low, according to some example embodiments.

FIG. 4 is a diagram illustrating power supplied to a bus when a transaction amount of the bus is low, according to some example embodiments. A third bus 420 may correspond to the bus 120 of FIG. 1. A power control circuit 430 of FIG. 4 may correspond to the power control circuit 130 of FIG. 1. FIG. 4 will be described with reference to FIGS. 1 to 3. Descriptions which are the same as or similar to the descriptions of FIGS. 1 to 3 may be omitted.

A PMIC 20 may supply power, which is needed or desired for processing a transaction, by using the third bus 420. The PMIC 20 may adjust power supplied to the third bus 320 by using a power control circuit 430. In some example embodiments, main power 21 or AON power 22 supplied by the PMIC 20 may be transferred to a main bus circuit 421 or a light bus circuit 422 or may be cut off, based on control by the power control circuit 430.

The third bus 420 may include a main bus circuit 421, a light bus circuit 422, and a bus controller 423. Although not shown, the third bus 420 may include a bridge, and the main bus circuit 421 may be connected to the light bus circuit 422 through the bridge. The third bus 420 may process a transaction by using at least one of the main bus circuit 421 and the light bus circuit 422, based on the amount of transactions TR4*a* generated by a fourth IP block 444 connected to the third bus 420. Although it is illustrated that only one IP block (for example, the fourth IP block 443) transfers a transaction to the third bus 420, the number of connected IP blocks may be more. The main bus circuit 421 may transfer or receive a transaction TR_MB3 to or from other devices. For example, the other devices may include another bus, IP block, or memory. In some example embodiments, the bus controller 423 may move a transaction which is to be processed between the main bus circuit 421 and the light bus circuit 422.

In some example embodiments, the third bus 420 may be in a state where the amount of transactions TR4*a* to be processed is low, based on the transaction TR4*a* by the fourth IP block 443. For example, the amount of transactions TR4*a* may be greater than or equal to a transaction threshold value processable by the light bus circuit 422 and may be less than a transaction threshold value processable by the main bus circuit 421. The third bus 420 may process the transaction TR4*a* of the third bus 420 by using the main bus circuit 421.

The power control circuit 430 may include a main bus power switch 431, a light bus power switch 432, and a power path controller 433. The power control circuit 430 may control power supplied to the third bus 420, based on the second control signal CTRL_PCC of the PMU 110. In some example embodiments, the second control signal CTRL_PCC of FIG. 1 may include a main bus power switch control signal CTRL3_MPSa, a light bus power switch control signal CTRL3_LPSa, and a power path controller control signal CTRL3_PPCa.

According to some example embodiments, the amount of transactions to be processed by the third bus 420 may be less than a transaction threshold value processable by the light bus circuit 422, or may be greater than or equal to a transaction threshold value processable by the light bus circuit 422 and may be less than a transaction threshold value processable by the main bus circuit 421. In this case, the PMU 110 may transfer the first control signal CTRL_BUS to the third bus 420 and may transfer the second control signal CTRL_PCC to the power control circuit 430. In response to the main bus power switch control signal CTRL3_MPSa included in the second control signal CTRL_PCC, the power control circuit 430 may perform control so that the main bus power switch 431 supplies the main power 21 to the main bus circuit 421. In response to the power path controller control signal CTRL3_PPCa included in the second control signal CTRL_PCC, the power control circuit 430 may perform control so that the power path controller 433 selects one power or does not select any one power from among the main power 21 and the AON power 22. In response to the light bus power switch control signal CTRL3_LPSa included in the second control signal CTRL_PCC, the power control circuit 430 may perform control so that the supply of power to the light bus circuit 422 is cut off.

Figure 5:
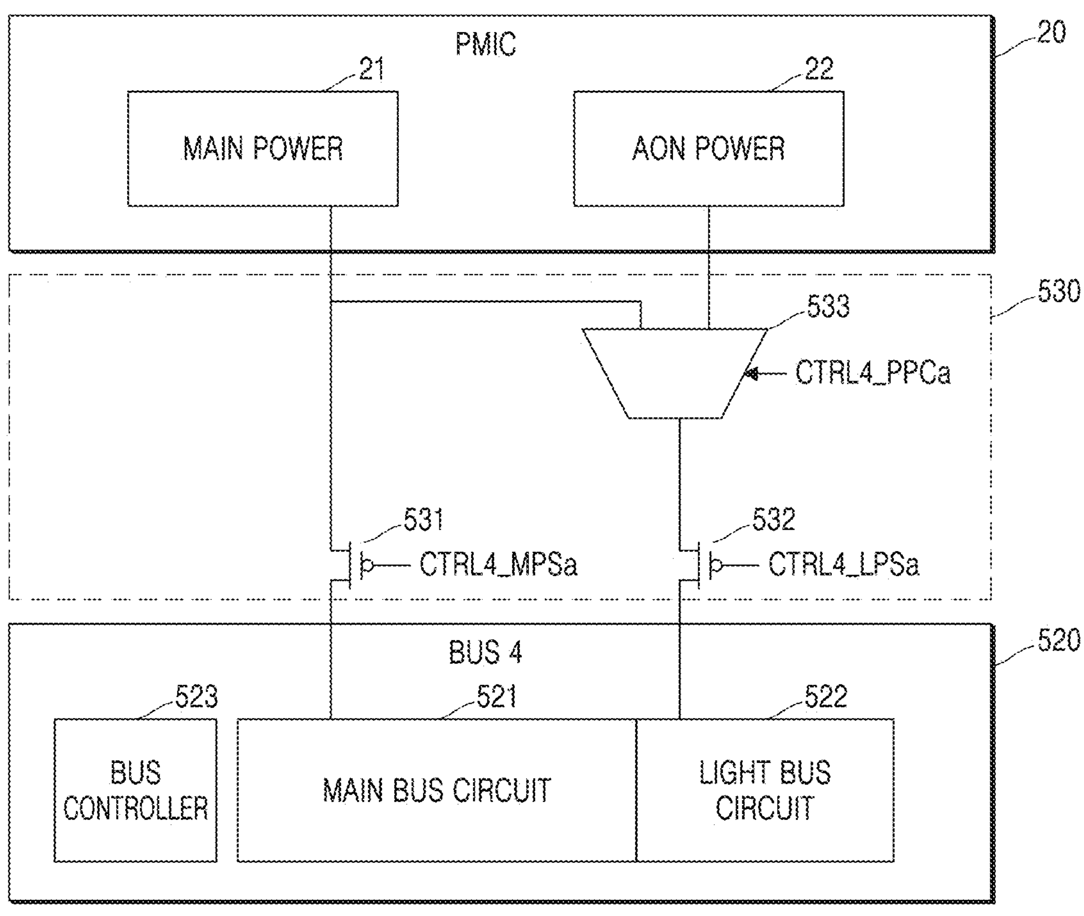
FIG. 5 is a diagram illustrating power supplied to a bus when there is no transaction which is to be processed by the bus, according to some example embodiments.

FIG. 5 is a diagram illustrating power supplied to a bus when there is no transaction which is to be processed by the bus, according to some example embodiments. A fourth bus 520 may correspond to the bus 120 of FIG. 1. A power control circuit 530 of FIG. 5 may correspond to the power control circuit 130 of FIG. 1. FIG. 5 will be described with reference to FIGS. 1 to 4. Descriptions which are the same as or similar to the descriptions of FIGS. 1 to 4 may be omitted.

A PMIC 20 may supply power, which is needed or desired for processing a transaction, by using the fourth bus 520. The PMIC 20 may adjust power supplied to the fourth bus 520 by using the power control circuit 530. In some example embodiments, main power 21 or AON power 22 supplied by the PMIC 20 may be transferred to a main bus circuit 521 or a light bus circuit 522 or may be cut off, based on control by the power control circuit 530.

The fourth bus 520 may include a main bus circuit 521, a light bus circuit 522, and a bus controller 523. Although not shown, the fourth bus 520 may include a bridge, and the main bus circuit 521 may be connected to the light bus circuit 522 through the bridge. In some example embodiments, the bus controller 523 may move a transaction which is to be processed between the main bus circuit 521 and the light bus circuit 522.

The power control circuit 530 may include a main bus power switch 531, a light bus power switch 532, and a power path controller 533. The power control circuit 530 may control power supplied to the fourth bus 520, based on the second control signal CTRL_PCC of the PMU 110. In some example embodiments, the second control signal CTRL_PCC of FIG. 1 may include a main bus power switch control signal CTRL4_MPSa, a light bus power switch control signal CTRL4_LPSa, and a power path controller control signal CTRL4_PPCa.

According to some example embodiments, although not shown in FIG. 5, as processing of a transaction generated by an IP block connected to the fourth bus 520 is completed, the fourth bus 520 may be in a state where there is no pending transaction, and the PMU 110 may control the power control circuit 530 to cut off power supplied to the fourth bus 520. In response to the main bus power switch control signal CTRL4_MPSa included in the second control signal CTRL_PCC, the power control circuit 530 may perform control so that the main bus power switch 531 cuts off the supply of the main power 21 to the main bus circuit 521. In response to the power path controller control signal CTRL4_PPCa included in the second control signal CTRL_PCC, the power control circuit 530 may perform control so that the power path controller 533 selects one power or does not select any one power from among the main power 21 and the AON power 22. In response to the light bus power switch control signal CTRL4_LPSa included in the second control signal CTRL_PCC, the power control circuit 530 may perform control so that the supply of the AON power 22 to the light bus circuit 522 is cut off.

Figure 6:
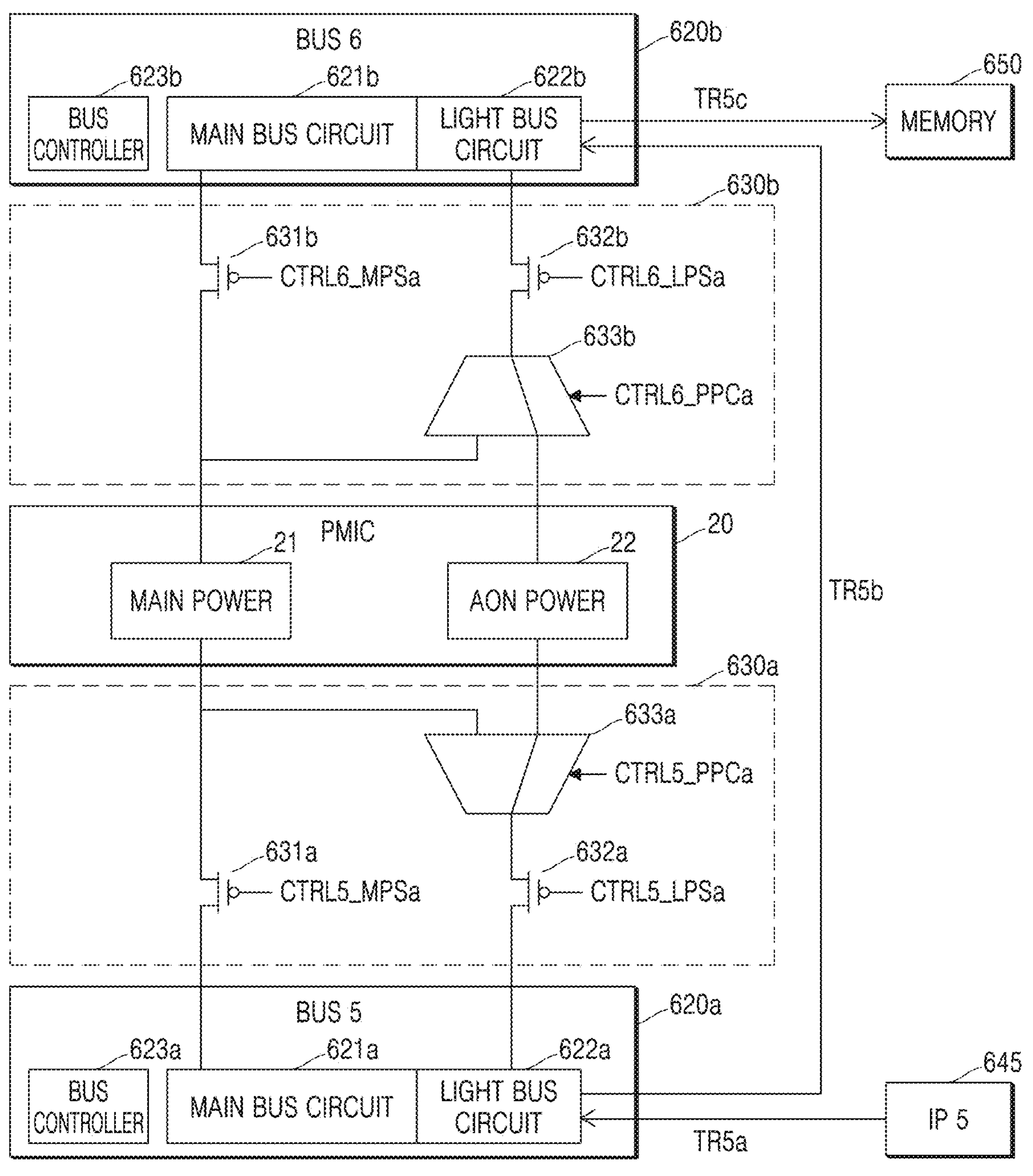
FIG. 6 is a diagram illustrating power supplied to a bus connected to an intellectual property (IP) block and a memory when a transaction amount of the bus is low, according to some example embodiments.

FIG. 6 is a diagram illustrating power supplied to a bus connected to an intellectual property (IP) block and a memory when a transaction amount of the bus is low, according to some example embodiments. A fifth bus 620*a* and a sixth bus 620*b* may correspond to the bus 120 of FIG. 1. Although only two buses (the fifth and sixth buses 620*a* and 620*b*) are illustrated in FIG. 6, more buses may be included in the SOC 10. A power control circuit 630*a* corresponding to the fifth bus 620*a* and a power control circuit 630*b* corresponding to the sixth bus 620*b* may each correspond to the power control circuit 130 of FIG. 1. FIG. 6 will be described with reference to FIGS. 1 to 5. Descriptions which are the same as or similar to the descriptions of FIGS. 1 to 5 may be omitted.

The PMIC 20 may supply power, which is needed or desired for processing a transaction, by using the fifth bus 620*a* and the sixth bus 620*b*. The PMIC 20 may adjust power supplied to the fifth bus 620*a* and the sixth bus 620*b* by using the power control circuit 630*a* corresponding to the fifth bus 620*a* and the power control circuit 630*b* corresponding to the sixth bus 620*b*. In some example embodiments, main power 21 or AON power 22 supplied by the PMIC 20 may be transferred to a main bus circuit 621*a* of the fifth bus 620*a*, a light bus circuit 621*b* of the sixth bus 620*b*, a main bus circuit 622*a* of the fifth bus 620*a*, and a light bus circuit 622*b* of the sixth bus 620*b*, or may be cut off, based on control by the power control circuit 630*a* corresponding to the fifth bus 620*a* and the power control circuit 630*b* corresponding to the sixth bus 620*b*.

The fifth bus 620*a* and the sixth bus 620*b* may respectively include main bus circuits 621*a* and 621*b*, light bus circuits 622*a* and 622*b*, and bus controllers 623*a* and 623*b*. Although not shown, each of (or alternatively, at least one of) the fifth bus 620*a* and the sixth bus 620*b* may include a bridge, and the main bus circuits 621*a* and 621*b* may be respectively connected to the light bus circuits 622*a* and 622*b* through the bridge. In some example embodiments, a fifth IP block 645 may need access to a memory 650 so as to perform an operation requested by a host, and processing of a transaction may be performed through the fifth bus 620*a* and the sixth bus 620*b*. The memory 650 may be in or outside the SOC 10. The memory 650 may store pieces of control information, such as various pieces of data, programs, and instructions used in the SOC 10. In some example embodiments, the memory 650 may be implemented as a volatile memory, and the volatile memory may include at least one of dynamic random access memory (RAM) (DRAM), synchronous DRAM (SDRAM), double data rate SDRAM (DDR SDRAM), low power double data rate SDRAM (LPDDR SDRAM), graphics double data rate SDRAM (GDDR SDRAM), Rambus DRAM (RDRAM), and static RAM (SRAM), but is not limited thereto.

The power control circuit 630*a* corresponding to the fifth bus 620*a* may include a main bus power switch 631*a* corresponding to the fifth bus 620*a*, a light bus power switch 632*a* corresponding to the fifth bus 620*a*, and a power path controller 633*a* corresponding to the fifth bus 620*a*. The power control circuit 630*b* corresponding to the sixth bus 620*b* may include a main bus power switch 631*b* corresponding to the sixth bus 620*b*, a light bus power switch 632*b* corresponding to the sixth bus 620*b*, and a power path controller 633*b* corresponding to the sixth bus 620*b*. The power control circuit 630*a* corresponding to the fifth bus 620*a* may receive the second control signal CTRL_PCC of the PMU 110 to control power supplied to the fifth bus 620*a*. The power control circuit 630*b* corresponding to the sixth bus 620*b* may receive the second control signal CTRL_PCC of the PMU 110 to control power supplied to the sixth bus 620*b*. In some example embodiments, the second control signal CTRL_PCC of FIG. 1 may include a main bus power switch control signal CTRL5_MPSa corresponding to the fifth bus 620*a*, a light bus power switch control signal CTRL5_LPSa corresponding to the fifth bus 620*a*, a power path controller control signal CTRL5_PPCa corresponding to the fifth bus 620*a*, a main bus power switch control signal CTRL6_MPSa corresponding to the sixth bus 620*b*, a light bus power switch control signal CTRL6_LPSa corresponding to the sixth bus 620*b*, and a power path controller control signal CTRL6_PPCa corresponding to the sixth bus 620*b*.

According to some example embodiments, the fifth IP block 645 may access the memory 650 so as to process a request of the host. The fifth IP block 645 may transfer a transaction TR5*a* to the fifth bus 620*a*. The fifth bus 620*a* may transfer a transaction TR5*b* to the sixth bus 620*b*. The sixth bus 620*b* may transfer a transaction to the memory 650. In processing transactions TR5*a*, TR5*b*, and TR5*c*, the amount of transactions may be less than a transaction threshold value of the light bus circuit 622*a* corresponding to the fifth bus 620*a* and may be less than a transaction threshold value of the light bus circuit 622*b* corresponding to the sixth bus 620*b*. In response to the main bus power switch control signal CTRL5_MPSa included in the second control signal CTRL_PCC, the power control circuit 630*a* corresponding to the fifth bus 620*a* may perform control so that the main bus power switch 631*a* cuts off the supply of the main power 21 to the main bus circuit 621*a*. In response to the power path controller control signal CTRL5_PPCa included in the second control signal CTRL_PCC, the power control circuit 630*a* corresponding to the fifth bus 620*a* may perform control so that the power path controller 633*a* selects the AON power 22 from among the main power 21 and the AON power 22. In response to the light bus power switch control signal CTRL5_LPSa included in the second control signal CTRL_PCC, the power control circuit 630*a* corresponding to the fifth bus 620*a* may perform control so that the AON power 22 is supplied to the light bus circuit 622*a*.

Figure 7:
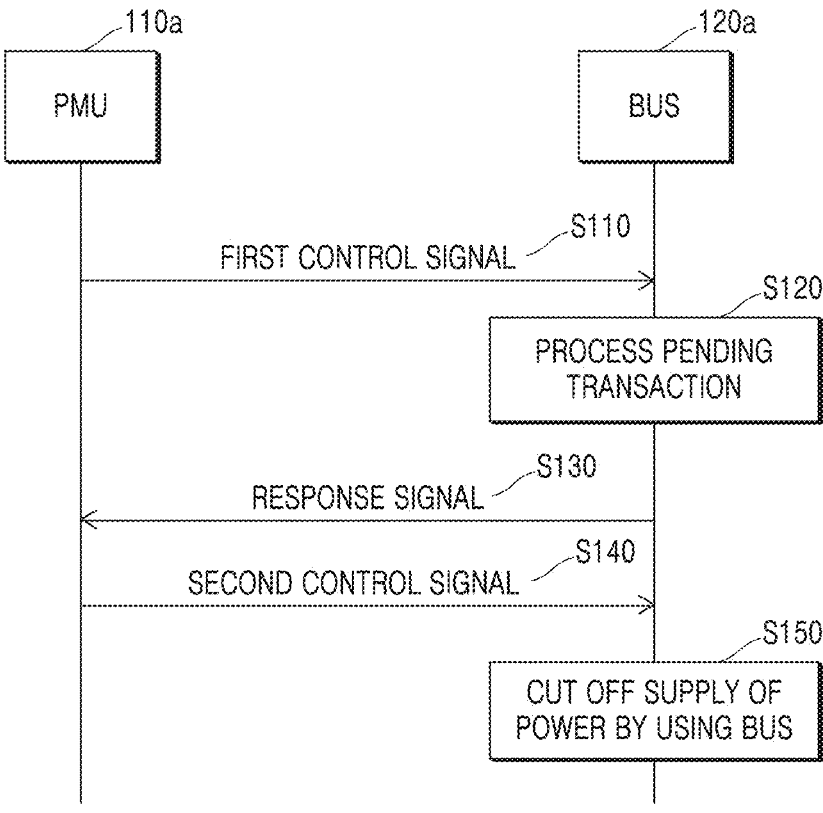
FIG. 7 is a diagram illustrating a bus power gating method with time when there is no light bus circuit.

FIG. 7 is a diagram illustrating a bus power gating method with time when there is no light bus circuit 122. Hereinafter, it may be assumed that a bus 120*a* of FIG. 7 does not include the light bus circuit 122 of FIG. 1. Although not shown, the bus 120*a* may include a bus power switch, which adjusts power supplied to a bus, in response to control by a PMU 110*a*.

Referring to FIG. 7, in operation S110, the PMU 110*a* may transfer a first control signal to the bus 120*a*. For example, the first control signal may be an LPI request signal.

In operation S120, the bus 120*a* may receive the first control signal from the PMU 110*a* and may perform processing of a pending transaction remaining in the bus 120*a*.

In operation S130, the bus 120*a* may complete processing of the pending transaction in operation S120, and then, may transfer a response signal to the PMU 110*a*. For example, the response signal may be an ACK signal.

In operation S140, the PMU 110*a* may transfer a second control signal to a bus power switch of the bus 120*a*. For example, the second control signal may include a power reduction control signal or a power cutoff control signal.

In operation S150, the bus power switch may decrease or cut off power supplied from a PMIC to the bus 120*a*, in response to the second control signal of the PMU 110*a*. Therefore, as power supplied to the bus 120*a* is reduced or cut off, power gating may be performed.

Figure 8:
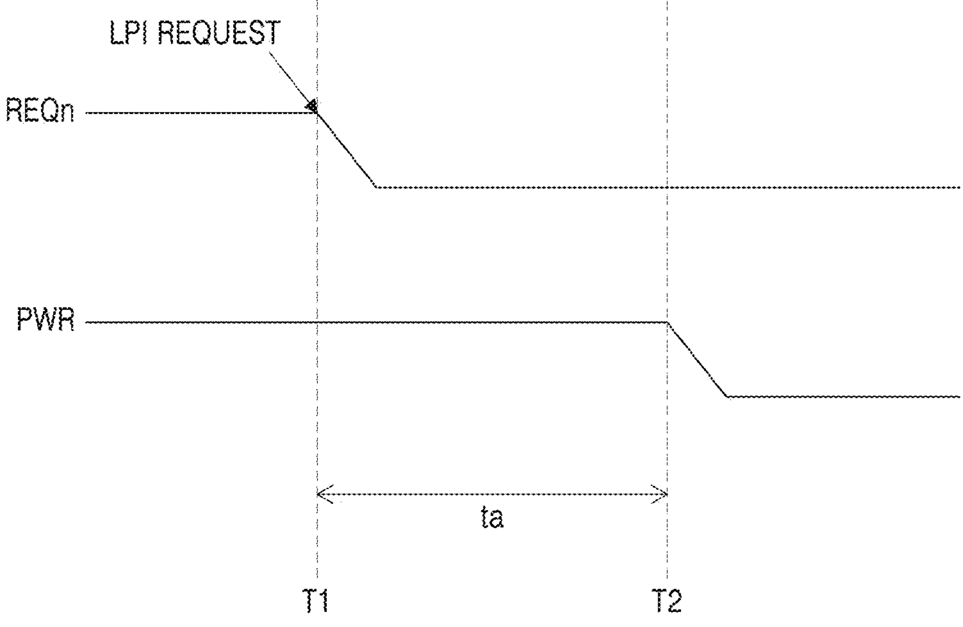
FIG. 8 is a diagram illustrating a power gating response time in the power gating method of FIG. 7.

FIG. 8 is a diagram illustrating a power gating response time in the power gating method of FIG. 7. FIG. 8 will be described with reference to FIG. 7.

In detail, FIG. 8 is a timing diagram showing a time at which the PMU 120*a* transfers a signal REQn to the bus 120*a* and a time at which power PWE supplied to the bus 120*a* is reduced or cut off, based on the power gating method of FIG. 7. In some example embodiments, REQn may represent a logic level of a terminal which transfers an LPI request between the PMU 110*a* and the bus 120*a*. For example, when the LPI request is transferred, the REQn may be low in logic level. PWR may represent power supplied to the bus 120*a*. A case where a logic level is high may denote a state where power is being supplied by a main power source, and a case where a logic level is low may denote a state where the supply of power is cut off.

Referring to FIG. 8, based on the method according to the example embodiment of FIG. 7, the PMU 110*a* may transfer an LPI request signal as a first control signal to the bus 120*a*. That is, the PMU 110*a* may transfer the LPI request signal to the bus 120*a* at a first time T1, so as to perform power gating on the bus 120*a*. The bus 120*a* may receive the LPI request signal from the PMU 110*a*, and then, may process all pending transactions remaining in the bus 120*a* before controlling power supplied to the bus 120*a*. The bus 120*a* may perform processing of a transaction up to a second time T2. A period ta from the first time T1 to the second time T2 may represent a power gating response time. The power gating response time ta of FIG. 8 may be a time taken in completing processing of the pending transactions. The power gating response time ta of FIG. 8 may vary based on the amount of pending transactions remaining in the bus 120*a*. The power supplied to the bus 120*a* may be reduced or cut off in a period after the second time T2. Due to the power gating response time ta of FIG. 8, power gating based on the method of FIG. 7 may be performed when it is ensured that there is no transaction of the bus 120*a*, and thus, power gating latency may occur, whereby a power gating entry rate may be low.

Figure 9:
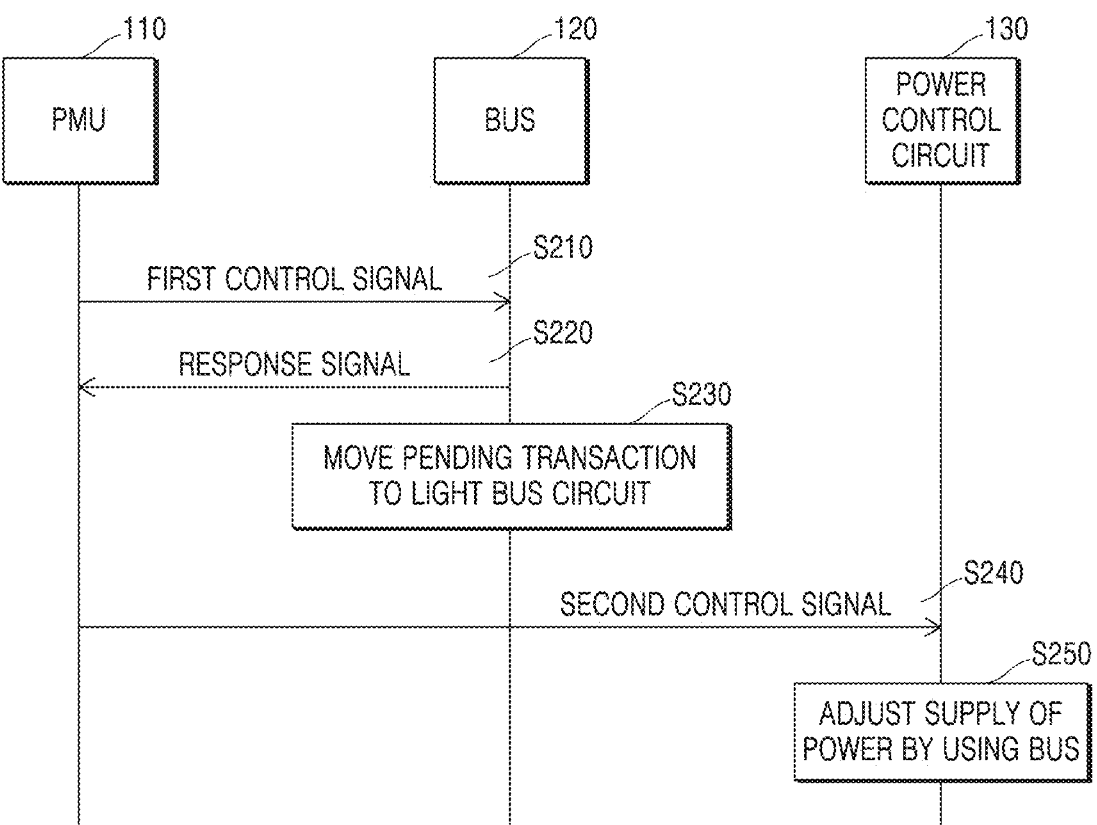
FIG. 9 is a diagram illustrating a bus power gating method with time, according to some example embodiments.

FIG. 9 is a diagram illustrating a bus power gating method with time, according to an embodiment. A PMU 110 of FIG. 9 may correspond to the PMU 110 of FIG. 1. A bus 120 of FIG. 9 may correspond to the bus 120 of FIG. 1. A power control circuit 130 of FIG. 9 may correspond to the power control circuit 130 of FIG. 1. FIG. 9 will be described with reference to FIG. 1.

Referring to FIG. 9, the bus 120 may process a transaction by using the main bus circuit 121 and the light bus circuit 122.

In operation S210, the bus 120 may process a transaction by using the main bus circuit 121 or both of the main bus circuit 121 and the light bus circuit 122. The PMU 110 may transfer the first control signal CTRL_BUS to the bus 120. For example, the first control signal CTRL_BUS may be an LPI request signal.

In operation S220, the bus 120 may receive the first control signal CTRL_BUS from the PMU 110 and may transfer the response signal ACK_BUS to the PMU 110. For example, the response signal may be an ACK signal.

In operation S230, the bus controller 123 may move a pending transaction, remaining in the bus 120, from the main bus circuit 121 to the light bus circuit 122.

In operation S240, the PMU 110 may transfer the second control signal CTRL_PCC to the power control circuit 130. For example, the second control signal CTRL_PCC may be a power control signal.

In operation S250, the power control circuit 130 may decrease or cut off power supplied from a PMIC to the bus 120 in response to control by the PMU 110, and thus, bus power gating of an SOC may be performed.

Figure 10:
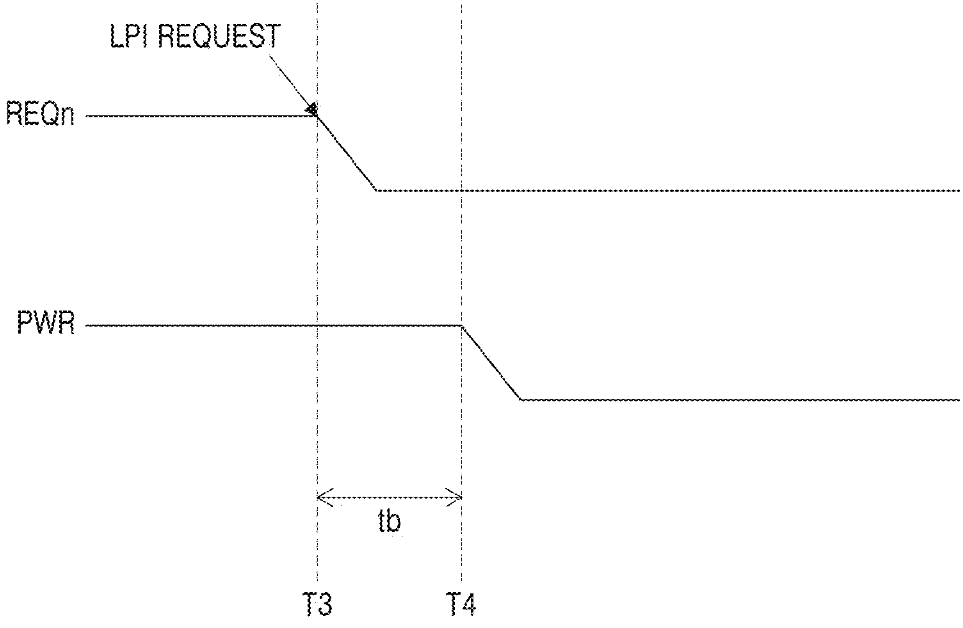
FIG. 10 is a diagram illustrating a power gating response time according to some example embodiments.

FIG. 10 is a diagram illustrating a power gating response time according to an embodiment. FIG. 10 will be described with reference to FIGS. 1, 8, and 9.

In detail, FIG. 10 is a timing diagram showing a time at which the PMU 110 transfers a signal REQn to the bus 120 and a time at which power PWE supplied to the bus 120 is reduced or cut off, based on the power gating method of FIG. 9. In an embodiment, REQn may represent a logic level of a terminal which transfers an LPI request between the PMU 110 and the bus 120.

For example, when the LPI request is transferred, the REQn may be low in logic level. PWR may represent power supplied to the bus 120*a*. A case where a logic level is high may denote a state where power is being supplied by a main power source, and a case where a logic level is low may denote a state where power is not supplied by the main power source.

For example, a case where a logic level is low may denote that a state where the supply of power is cut off or power is being supplied by an AON power source.

Referring to FIG. 10, the PMU 110 may transfer an LPI request signal as the first control signal CTRL_BUS to the bus 120. That is, the PMU 110 may transfer the LPI request signal to the bus 120 at a third time T3, so as to perform power gating on the bus 120. The bus 120 may receive the LPI request signal from the PMU 110, and immediately, may transfer an ACK signal as the response signal ACK_BUS to the PMU 110. Therefore, unlike FIG. 8, power supplied to the bus 120 may be changed from the main power MAIN_PWR to the AON power AON_PWR before processing of the pending transaction is completed, and thus, power supplied to the bus 120 at a fourth time T4 may be reduced or cut off. A period tb from the third time T3 to the fourth time T4 may represent a power gating response time. The power gating response time tb of FIG. 10 may be a time taken in moving a pending transaction of the bus 120 from the main bus circuit 121 to the light bus circuit 122. Therefore, the power gating response time tb of FIG. 10 may be the power gating response time to of FIG. 8.

Figure 11:
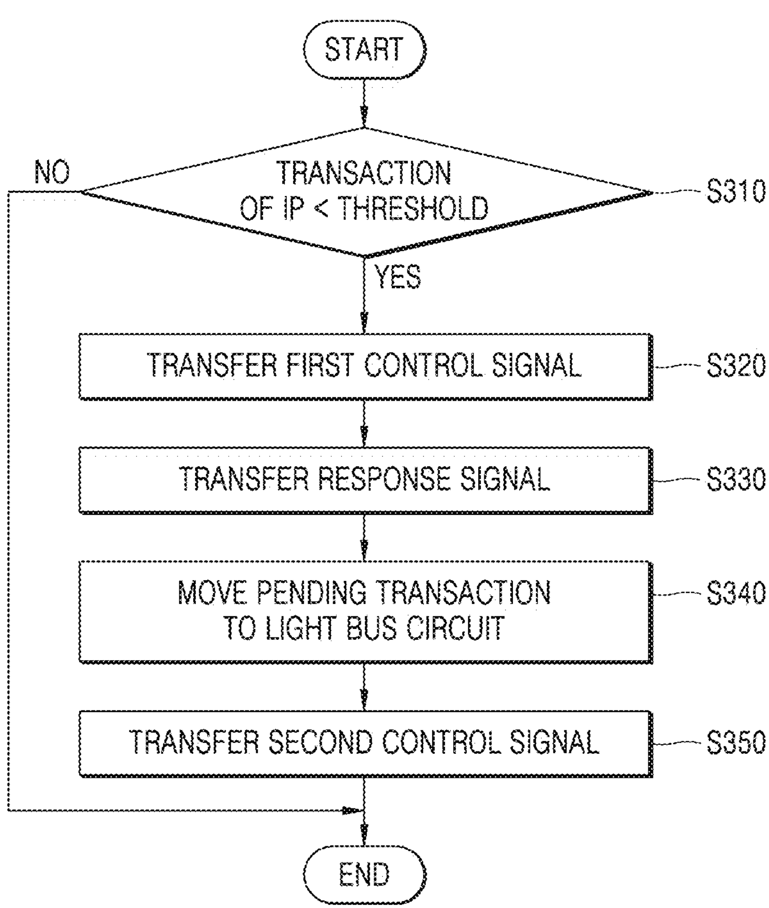
FIG. 11 is a flowchart illustrating a power gating method of a system on chip, according to some example embodiments.

FIG. 11 is a flowchart illustrating a power gating method of a system on chip, according to an embodiment. FIG. 11 will be described with reference to FIG. 1.

Referring to FIG. 11, in operation S310, the bus 120 may process transactions corresponding to the IP blocks 141 and 142 by using the main bus circuit 121 and the light bus circuit 122. Although not shown, the SOC 10 may include a central processing unit (CPU). The CPU of the SOC 10 may compare the amount of transactions, which are being processed by the bus 120, with a transaction threshold value, which is a transaction limit processable by the light bus circuit 122. In an embodiment, a transaction threshold value processable by the main bus circuit 121 may be greater than the transaction threshold value processable by the light bus circuit 122.

In operation S320, the PMU 110 may generate the first control signal CTRL_BUS, based on a result of the comparison, which is performed in operation S310. When it is determined in operation S310 that the amount of transactions to be processed by the bus 120 is less than the transaction threshold value of the light bus circuit 122, the PMU 110 may generate the first control signal CTRL_BUS and may transfer the first control signal CTRL_BUS to the bus 120. For example, the first control signal CTRL_BUS may be an LPI request signal, which is a control signal for lowering a voltage supplied to the bus 120. In an embodiment, the first control signal CTRL_BUS may be received by the bus controller 123.

In operation S320, when it is determined by the CPU in operation S310 that the amount of transactions to be processed by the bus 120 is greater than or equal to the transaction threshold value of the light bus circuit 122, the PMU 110 may not transfer the first control signal CTRL_BUS to the bus 120, and thus, power gating may end.

In operation S330, the bus 120 may transfer the response signal ACK_BUS to the PMU 110 in response to the first control signal CTRL_BUS. For example, the response signal ACK_BUS may be an ACK signal. In an embodiment, processing of the pending transaction may not be performed before the bus 120 transfers the response signal ACK_BUS based on the first control signal CTRL_BUS of the PMU 110, and thus, a time at which the bus 120 transfers the response signal ACK_BUS may be immediately after the first control signal is received.

In operation S340, the bus 120 may move the pending transaction to the light bus circuit 122. The bus 120 may move a transaction between the main bus circuit 121 and the light bus circuit 122 so that processing of the transaction is performed by the light bus circuit 122. In detail, the movement of the transaction may be performed by the bus controller 123. In an embodiment, processing of the pending transaction may be performed by using only the main bus circuit 121, performed by using only the light bus circuit 122, or performed by using both of the main bus circuit 121 and the light bus circuit 122. In an embodiment, in a case where the bus 120 processes a transaction by using both of the main bus circuit 121 and the light bus circuit 122 before the bus 120 receives the LPI request signal from the PMU 110, the bus controller 123 may move the transaction so that processing of the transaction is processed by using only the light bus circuit 122, so as to decrease power supplied to the bus 120 based on the LPI request signal of the PMU 110. In an embodiment, in a case where the bus 120 processes a transaction by using the main bus circuit 121 before the bus 120 receives the LPI request signal from the PMU 110, the bus controller 123 may move the transaction so that processing of the transaction is processed by using only the light bus circuit 122, so as to decrease power supplied to the bus 120 based on the LPI request signal of the PMU 110.

In operation S350, the PMU 110 may transfer the second control signal CTRL_PCC to the power control circuit 130. For example, the second control signal CTRL_PCC may be a power adjustment signal for adjusting the power supplied to the bus 120. The power control circuit 130 may control the power supplied to the bus 120 in response to the second control signal CTRL_PCC of the PMU 110. The second control signal CTRL_PCC may include a control signal corresponding to the main bus power switch 131, a control signal corresponding to the light bus power switch 132, and a control signal corresponding to the power path controller 133. In an embodiment, operation S350 may be performed when the bus 120 is in an idle state. Operation S350 will be described in more detail with reference to FIG. 12.

Figure 12:
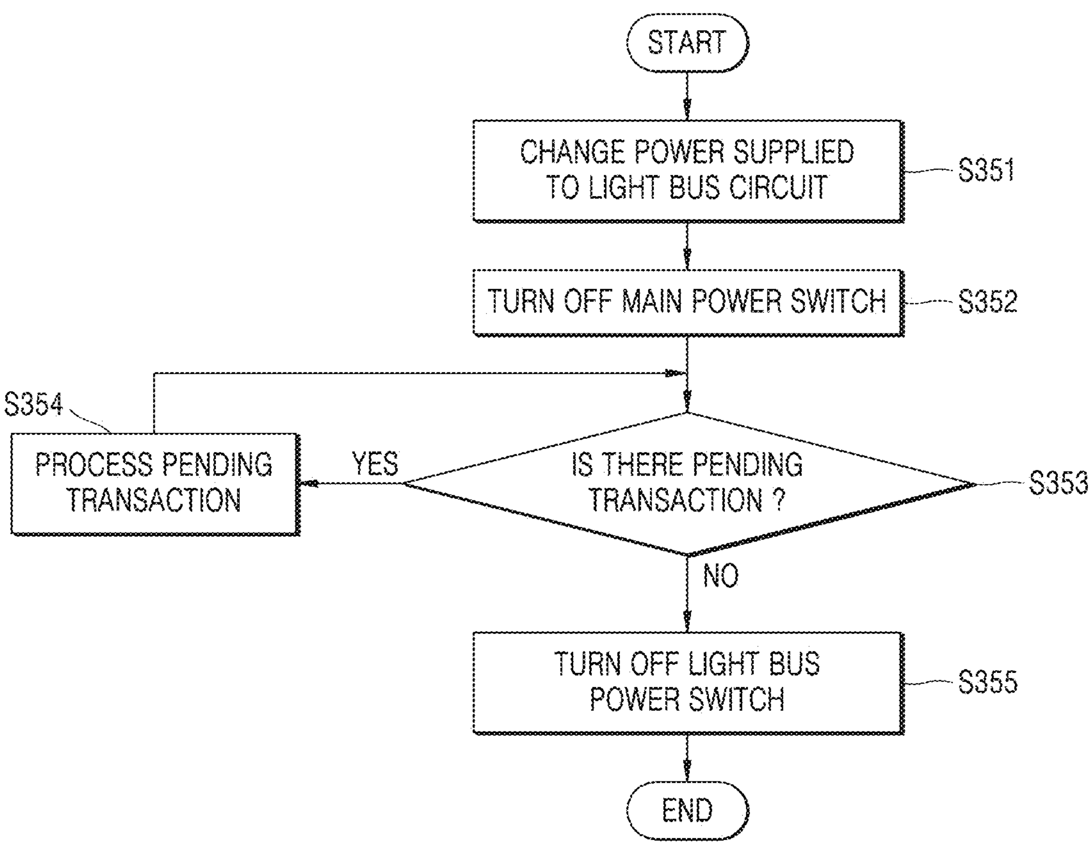
FIG. 12 is a flowchart for describing in detail operation S350 of FIG. 11.

FIG. 12 is a flowchart for describing in detail operation S350 of FIG. 11. FIG. 12 will be described with reference to FIG. 1.

Referring to FIG. 12, in operation S351, the power control circuit 130 which has received the second control signal CTRL_PCC of the PMU 110 may allow power, supplied to the light bus circuit 122 through the power path controller 133, to be changed. For example, the power path controller 133 may selectively provide the main power MAIN_PWR and the AON power AON_PWR to the light bus circuit 122, or may control power supplied to the light bus circuit 122 so that any power is not output to the light bus circuit 122. In an embodiment, the power control circuit 130 which has received the second control signal CTRL_PCC of the PMU 110 may perform control so that power supplied to the light bus circuit 122 through the power path controller 133 is changed from the main power MAIN_PWR to the AON power AON_PWR.

In operation S352, the power control circuit 130 which has received the second control signal CTRL_PCC of the PMU 110 may cut off the main power MAIN_PWR supplied to the main bus circuit 121 through the main bus power switch 131 in response to the second control signal CTRL_PCC.

In operation S353, the bus controller 123 which has received the second control signal CTRL_PCC of the PMU 110 may determine whether the light bus circuit 122 is processing a pending transaction.

In operation S354, when processing of the pending transaction is being performed by the light bus circuit 122, the power control circuit 130 may not cut off the light bus power switch 132 and may stand by until the light bus circuit 122 completes the processing of the pending transaction.

In operation S355, when the light bus circuit 122 completes the processing of the pending transaction, the power control circuit 130 may cut off the AON power AON_PWR supplied to the light bus circuit 122 through the light bus power switch 132. In an embodiment, when the main power MAIN_PWR is supplied to the light bus circuit 122 through the light bus power switch 132, the light bus power switch 132 may cut off the supply of the main power MAIN_PWR.

FIG. 13 is a block diagram illustrating an electronic device 1 according to an embodiment.

Referring to FIG. 13, the electronic device 1 may be implemented with a handheld device such as a mobile phone, a smartphone, a tablet personal computer (PC), a personal digital assistant (PDA), an enterprise digital assistant (EDA), a digital still camera, a digital video camera, a portable multimedia player (PMP), a personal navigation device (or portable navigation device) (PND), a handheld game console, or an e-book.

The electronic device 1 may include an SOC 1000, an external memory 1850, a display device 1550, and a PMIC 1950.

The SOC 1000 may include a CPU 1100, a clock management unit (CMU) 1200, a graphics processing unit (GPU) 1300, a timer 1400, a display controller 1500, RAM 1600, read only memory (ROM) 1700, a memory controller 1800, a PMU 1910, and a bus 1050. The SOC 1000 may further include other elements in addition to the illustrated elements. For example, the electronic device 1 may further include the display device 1550, the external memory 1850, and the PMIC 1950. The PMIC 1950 may be implemented outside the SOC 1000. However, the example embodiments are not limited thereto, and the SOC 1000 may include a PMU for performing a function of the PMIC 1950.

The CPU 1100 may be referred to as a processor and may process or execute programs and/or data stored in the external memory 1850. For example, the CPU 1100 may process or execute programs and/or data in response to an operation clock signal output from the CMU 1200.

The CPU 1100 may be implemented as a multi-core processor. The multi-core processor may include one computing component including two or more independent substantial processors (referred to as cores), and each of the processors may read and execute program instructions. The programs and/or the data, stored in the ROM 1700, the RAM 1600, and/or the external memory 1850, may be loaded into a memory (not shown) of the CPU 1100 depending on the case.

The CMU 1200 may generate the operation clock signal. The CMU 1200 may include a clock signal generating device such as a phase locked loop (PLL), a delayed locked loop (DLL), or a crystal oscillator.

The operation clock signal may be supplied to the GPU 1300. The operation clock signal may be supplied to the other element (for example, the CPU 1100 or the memory controller 1800). The CMU 1200 may vary a frequency of the operation clock signal.

The GPU 1300 may convert read data, read from the external memory 1850 by the memory controller 1800, into a signal suitable for the display device 1550.

The timer 1400 may output a count value representing a time, based on the operation clock signal output from the CMU 1200.

The display device 1550 may display image signals output from the display controller 1500. For example, the display device 1550 may be implemented as a liquid crystal display (LCD), a light-emitting diode (LED) display, an organic LED (OLED) display, an active-matrix OLED (AMOLED) display, or a flexible display. The display controller 1500 may control an operation of the display device 1550.

The RAM 1600 may temporarily store programs, data, or instructions. For example, programs and/or data stored in a memory may be temporarily stored in the RAM 1600, based on control by the CPU 1100 or a booting code stored in the ROM 1700. The RAM 1600 may be implemented as DRAM or static RAM (SRAM).

The ROM 1700 may store permanent programs and/or data. The ROM 1700 may be implemented as erasable programmable read-only memory (EPROM) or electrically erasable programmable read-only memory (EEPROM).

The memory controller 1800 may communicate with the external memory 1850 through an interface. The memory controller 1800 may overall control an operation of the external memory 1850 and may control data exchange between a host and the external memory 1850. For example, the memory controller 1800 may write data in the external memory 1850 or may read data from the external memory 1850, based on a request of the host. Here, the host may be a master device such as the CPU 1100, the GPU 1300, or the display controller 1500.

The external memory 1850 may be a storage medium for storing data and may store an operating system (OS), various programs, and/or various pieces of data. The external memory 1850 may be, for example, DRAM, but is not limited thereto. For example, the external memory 1850 may be a non-volatile memory device (for example, flash memory, phase RAM (PRAM), magnetic RAM (MRAM), resistive RAM (RRAM), or ferroelectric RAM (FeRAM). In another embodiment, the external memory 1850 may be an internal memory included in the SOC 1000. Also, the external memory 1850 may be flash memory, an embedded multimedia card (eMMC), or a universal flash storage (UFS).

The PMU 1910 may control a voltage needed or desired for operations of devices connected to the SOC 1000.

The CPU 1100, the CMU 1200, the GPU 1300, the timer 1400, the display controller 1500, the RAM 1600, the ROM 1700, the memory controller 1800, the power control circuit 1900, and the PMU 1910 may communicate with one another through the bus 1050.

Figure 14:
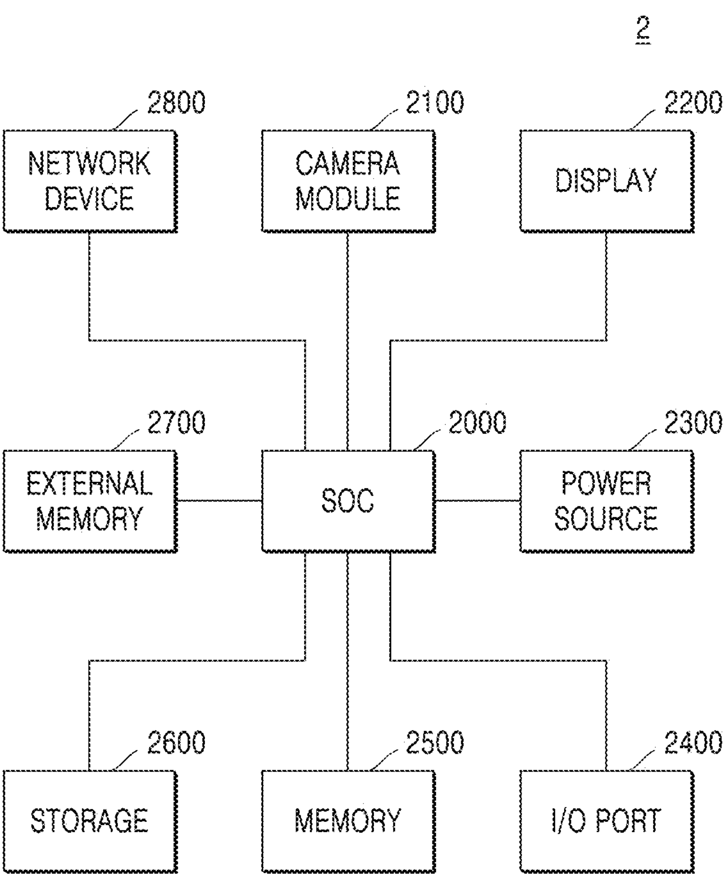
FIG. 14 is a block diagram illustrating an electronic device according to another example embodiment.

FIG. 14 is a block diagram illustrating an electronic device 2 according to another embodiment.

Referring to FIG. 14, the electronic device 2 may be implemented as a PC, a data server, or a portable electronic device.

The electronic device 2 may include an SOC 2000, a camera module 2100, a display 2200, a power source 2300, an input/output (I/O) port 2400, a memory 2500, a storage 2600, an external memory 2700, and a network device 2800.

The camera module 2100 may denote a module for converting an optical image into an electrical image. Therefore, the electrical image output from the camera module 2100 may be stored in the storage 2600, the memory 2500, or the external memory 2700. Also, the electrical image output from the camera module 2100 may be displayed by the display 2200.

The display 2200 may display data output from the storage 2600, the memory 2500, the I/O port 2400, the external memory 2700, or the network device 2800. The display 2200 may be the display device 1550 illustrated in FIG. 13.

The power source 2300 may supply an operation voltage to one of the elements. The power source 2300 may be controlled by the PMIC 1950 illustrated in FIG. 13.

The I/O port 2400 may denote ports which transfer data to the electronic device 1 or transfer data, output from the electronic device 2, to an external device. For example, the I/O port 2400 may be a port for accessing a pointing device such as a computer mouse, a port for accessing a printer, or a port for accessing a USB drive.

The memory 2500 may be implemented as a volatile memory or a non-volatile memory. According to an embodiment, a memory controller for controlling a data access operation (for example, a read operation, a write operation (or a program operation)) or an erase operation on the memory 2500 may be integrated or embedded into the SOC 2000. According to another embodiment, the memory controller may be implemented between the SOC 2000 and the memory 2500.

The storage 2600 may be implemented as a hard disk drive or a solid state drive (SSD).

The external memory 2700 may be implemented as a secure digital (SD) card or a multimedia card (MMC). According to an embodiment, the external memory 2700 may be a subscriber identification module (SIM) card or a universal subscriber identity module (USIM) card.

The network device 2800 may denote a device for connecting the electronic device 2 to a wired network or a wireless network.

Hereinabove, example embodiments have been described in the drawings and the specification. using the terms described herein, but this has been merely used for describing the example embodiments and has not been used for limiting a meaning or limiting the scope of the example embodiments defined in the following claims. Therefore, it may be understood by those of ordinary skill in the art that various modifications and other equivalent example embodiments may be implemented from the inventive concepts. Accordingly, the spirit and scope of the inventive concepts may be defined based on the spirit and scope of the following claims.

Any of the elements and/or functional blocks disclosed above may include or be implemented in processing circuitry such as hardware including logic circuits; a hardware/software combination such as a processor executing software; or a combination thereof. For example, the bus controller 123, and PMU 110 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the inventive concepts has been particularly shown and described with reference to some example embodiments thereof, it will be understood that various changes in form and details may be made therein without departing from the spirit and scope of the following claims.

What is claimed is:

1. A power gating method of a system on chip including a power management unit (PMU) including at least one register, a power control circuit, and a bus including a main bus circuit, a light bus circuit, and a bus controller including processing circuitry configured to process a pending transaction that has not yet been processed and is pending at the bus, the power gating method comprising:

transferring a first control signal from the PMU to the bus;

transferring, in response to the first control signal, a response signal to the PMU prior to completion of the pending transaction;

moving, by the bus controller, the pending transaction pending i) either at a combination of the main bus circuit and the light bus circuit or ii) exclusively at the main bus circuit to the light bus circuit after transferring the response signal from the bus to the PMU such that the pending transaction is moved internally within the bus to the light bus circuit subsequent to the pending transaction being received by the bus; and transferring a second control signal to the power control circuit by using the PMU to adjust power supplied to the bus, based on the response signal.

2. The power gating method of claim 1, wherein a transaction threshold value of the main bus circuit is greater than a transaction threshold value of the light bus circuit, and the power supplied to the bus is adjusted in response the bus being in an idle state.

3. The power gating method of claim 1, wherein the pending transaction is one of a plurality of pending transactions, and the transferring the first control signal to the bus comprises generating the first control signal by using the PMU based on an amount of the plurality of pending transactions being processed by the bus and a transaction threshold value of the light bus circuit.

4. The power gating method of claim 3, wherein the transferring the first control signal to the bus comprises, in response to the amount of the plurality of pending transactions being processed by the bus being less than the transaction threshold value, providing the first control signal to the bus by using the PMU.

5. The power gating method of claim 1, wherein the power supplied to the bus is adjusted by selectively providing first power or second power to the light bus circuit by using the power control circuit in response to the second control signal.

6. The power gating method of claim 5, wherein the selectively providing the first power or the second power to the light bus circuit comprises cutting off power supplied to the main bus circuit by using the power control circuit in response to the second control signal.

7. The power gating method of claim 5, wherein the pending transaction is one of a plurality of pending transactions, and the power supplied to the bus is adjusted by, identifying the pending transaction moved to the light bus circuit by using the bus, and cutting off the first power or the second power provided to the bus by using the power control circuit based on an amount of the plurality of pending transactions.

8. The power gating method of claim 7, wherein the cutting off the first power or the second power comprises, in response the amount of the plurality of pending transactions being zero, cutting off the first power or the second power provided to the light bus circuit by using the power control circuit.

9. A system on chip comprising:

a bus including a main bus circuit, a light bus circuit and a bus controller including processing circuitry, the bus being configured to process a pending transaction that has not yet been processed and is at the bus by using one or more of the main bus circuit and the light bus circuit and allow the pending transaction to be processed by the light bus circuit based on a transaction threshold value of the light bus circuit, the pending transaction being one of a plurality of transactions that has not yet been processed and is at the bus;

a power control circuit including a main bus power switch, a light bus power switch, and a power path controller, the power control circuit being configured to control power supplied to the bus; and a power management unit (PMU) including at least one register, the PMU configured to, generate a first control signal and a second control signal based on an amount of the plurality of transactions, transfer the first control signal to the bus to control an operation of the bus, wherein, in response to the first control signal, the bus is configured to transfer a response signal to the PMU prior to the bus controller moving the pending transaction that is pending i) either at a combination of the main bus circuit and the light bus circuit or ii) exclusively at the main bus circuit to the light bus circuit after transferring the response signal to the PMU such that the pending transaction is moved internally within the bus to the light bus circuit subsequent to the pending transaction being received by the bus, and transfer the second control signal to the power control circuit to control an operation of the power control circuit.

10. The system on chip of claim 9, wherein the power path controller is configured to select at least one of a first power source providing a first power and a second power source providing second power and supply the first power or the second power to the light bus circuit based on the selection and in response to the second control signal.

11. The system on chip of claim 9, wherein the main bus power switch is configured to cut off first power supplied to the main bus circuit through the main bus power switch, in response to the second control signal.

12. The system on chip of claim 9, wherein the light bus power switch is configured to cut off first power or second power supplied to the light bus circuit through the power path controller in response to the second control signal.

13. The system on chip of claim 9, wherein the at least one register of the PMU is configured to store information about the transaction threshold value of the light bus circuit.

14. The system on chip of claim 13, wherein, the PMU is further configured to, in response to an amount of the plurality of transactions being less than the transaction threshold value, generate the first control signal and the second control signal.

15. The system on chip of claim 9, wherein, in response to the amount of the plurality of transactions being greater than or equal to the transaction threshold value, the bus is configured to process the pending transaction by using the main bus circuit and the light bus circuit, and the power control circuit is configured to supply main power to the bus.

16. The system on chip of claim 9, wherein, in response to the amount of the plurality of transactions being less than the transaction threshold value, the bus is configured to process the pending transaction by using the light bus circuit, and the power control circuit is configured to supply second power to the bus based on control by the PMU and control the main bus power switch to cut off supply of first power.

17. The system on chip of claim 16, wherein the power control circuit is configured to, after the light bus circuit processes all of the plurality of pending transactions, control the light bus power switch to cut off power supplied to the bus, based on control by the PMU.

18. A bus comprising:

a main bus circuit, a light bus circuit and a bus controller including processing circuitry, the main bus circuit and the light bus circuit each configured to process a pending transaction, the pending transaction being one of the plurality of pending transactions of the bus that has not yet been processed, wherein, in response to an amount of the plurality of pending transactions being greater than or equal to a transaction threshold value of the light bus circuit, the bus is configured to process the pending transaction by using the main bus circuit and the light bus circuit, and in response to the amount of the plurality of pending transactions being less than the transaction threshold value, the bus is configured to process the pending transaction by using the light bus circuit by, transferring, in response to a first control signal from a power management unit (PMU), a response signal to the PMU prior to completion of the pending transaction on the bus, the PMU including at least one register, and moving, by the bus controller, the pending transaction that is pending i) either at a combination of the main bus circuit and the light bus circuit or ii) exclusively at the main bus circuit to the light bus circuit after transferring the response signal such that the pending transaction is moved internally within the bus to the light bus circuit subsequent to the pending transaction being received by the bus.

19. The bus of claim 18, wherein the bus is configured to be supplied with power from at least one of first power and second power, in response to the amount of the plurality of pending transactions being greater than or equal to the transaction threshold value, the bus is configured to be supplied with power from the first power to process the pending transaction, and in response to the amount of the plurality of pending transactions being less than the transaction threshold value, the bus is configured to be supplied with power from the second power to process the pending transaction.

20. The bus of claim 18, wherein the bus further comprises:

at least one bridge configured to connect the main bus circuit and the light bus circuit.

* * * * *